(12) United States Patent
Choi

(10) Patent No.: US 8,801,246 B2
(45) Date of Patent: Aug. 12, 2014

(54) VEHICLE LAMP

(71) Applicant: Hyundai Mobis Co., Ltd., Seoul (KR)

(72) Inventor: Ban Suk Choi, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 2 days.

(21) Appl. No.: 13/674,881

(22) Filed: Nov. 12, 2012

(65) Prior Publication Data

US 2013/0322103 A1 Dec. 5, 2013

(30) Foreign Application Priority Data

Jun. 4, 2012 (KR) .................. 10-2012-0059790
Jun. 4, 2012 (KR) .................. 10-2012-0059791

(51) Int. Cl.
*F21S 8/10* (2006.01)
*B60Q 1/00* (2006.01)

(52) U.S. Cl.
CPC .......... *B60Q 1/0011* (2013.01); *F21S 48/225* (2013.01); *F21S 48/2268* (2013.01); *F21S 48/2281* (2013.01); *F21S 48/234* (2013.01); *F21S 48/2237* (2013.01); *F21S 48/24* (2013.01)
USPC ..................... 362/511; 362/517; 362/518

(58) Field of Classification Search
USPC ......................... 362/511, 517–518
See application file for complete search history.

(56) References Cited

U.S. PATENT DOCUMENTS

| | | | |
|---|---|---|---|
| 5,365,412 A | 11/1994 | Koppolu et al. | |
| 5,700,078 A | 12/1997 | Fohl et al. | |
| 5,890,796 A * | 4/1999 | Marinelli et al. | ............. 362/307 |
| 8,360,623 B2 * | 1/2013 | Lin et al. | ................. 362/511 |
| 8,376,597 B2 * | 2/2013 | Nakata et al. | ................. 362/511 |
| 8,480,266 B2 * | 7/2013 | Futami | ............. 362/298 |
| 2008/0285256 A1 | 11/2008 | Mezouari et al. | |
| 2011/0242831 A1 * | 10/2011 | Okui et al. | .................. 362/511 |
| 2011/0310630 A1 * | 12/2011 | Nakata et al. | ................. 362/511 |
| 2012/0002433 A1 * | 1/2012 | Cha et al. | ................. 362/518 |
| 2012/0224385 A1 * | 9/2012 | Godbillon et al. | ............. 362/511 |

FOREIGN PATENT DOCUMENTS

| | | |
|---|---|---|
| JP | 2012-009356 A | 1/2012 |
| KR | 10-2003-0043171 A | 6/2003 |
| KR | 10-2011-0050819 A | 5/2011 |
| KR | 10-2012-0002088 A | 1/2012 |
| KR | 10-2012-0012179 A | 2/2012 |

OTHER PUBLICATIONS

Korean Office Action dated Oct. 1, 2013 of corresponding Korean Patent Application No. No. 10-2012-0059791—4 pages.

* cited by examiner

*Primary Examiner* — Mary Ellen Bowman

(74) *Attorney, Agent, or Firm* — Knobbe, Martens, Olson & Bear, LLP

(57) ABSTRACT

Disclosed is a vehicle lamp, including a reflector reflecting light of a light guide, wherein the reflector includes a first reflection surface and a second reflection surface forming an inner circumferential surface, together with at least a part of a light emitting surface of the light guide and the inner circumferential surface is converged in a direction opposite to an irradiation direction to form a convergent point. By this configuration, it is possible to reduce manufacturing costs and manufacturing man hour of the vehicle lamp while increasing aesthetic appearance of the vehicle.

26 Claims, 14 Drawing Sheets

(a)　　　　　　　　　　　(b)

(a)   (b)

(a)　　　　　　　　　　(b)

VEHICLE LAMP

CROSS-REFERENCE TO RELATED APPLICATIONS

This application claims priority to and the benefit of Korean Patent Application No. 10-2012-0059790 and 10-2012-0059791 filed in the Korean Intellectual Property Office on Jun. 4, 2012, the entire contents of which are incorporated herein by reference.

FIELD

The present disclosure relates to a vehicle lamp, and more particularly, to a vehicle lamp implementing lighting images using a light guide and a reflector.

BACKGROUND

Generally, a vehicle lamp is largely classified into a head lamp installed at a front of a vehicle and a tail lamp installed at a back of a vehicle. The tail lamp performs functional roles, such as a brake operation display, a direction display, or an alarm display, but performs an aesthetic role for forming an image of a rear of a vehicle. Considering the situation in which an importance of a design of a vehicle in a product value of a vehicle is gradually increased, aesthetic appearance of the tail lamp may be a very important factor in improving a product value of a vehicle.

However, a general tail lamp has a simple configuration including a bulb that is a light source and a reflector that reflects light of the bulb. For this reason, there is a problem in that a shape of lighting images of the tail lamp is unified. Therefore, a method for increasing aesthetic appearance of lighting images by installing a light source such as a lighting device using a plurality of LEDs has been proposed, which leads to a problem in that a large number of light sources are required.

A demand for the lighting images using indirect reflection rather than the lighting images configured to have a multi-dot shape due to the increase in an index of emotional quality of a consumer has been increased.

SUMMARY

One aspect of the present invention has been made in an effort to provide a vehicle lamp capable of implementing lighting images having differentiated patterns by using a small number of light sources.

Another aspect of the present invention has also been made in an effort to provide a vehicle lamp capable of increasing visibility and showing a constant shape of a lighting image even though being seen at any angle.

An exemplary embodiment of the present invention provides a vehicle lamp, including: a reflector reflecting light of a light guide, in which the reflector includes a first reflection surface and a second reflection surface forming an inner circumferential surface, together with at least a part of a light emitting surface of the light guide and the inner circumferential surface is converged in a direction opposite to an irradiation direction to form a convergent point.

At least a part of the light emitting surface may form a first image that is a real image, the first reflection surface may reflect the first image to form a second image that is a virtual image, and the second reflection surface may reflect the first image to form a third image that is a virtual image.

The first image, the second image, and the third image may be connected with one another.

When the first image, the second image, and the third image are formed of a line, the first image, the second image, and the third image may form a triangle. When the first image, the second image, and the third image are formed of a surface, the first image, the second image, and the third image may form an apex-truncated trigonal pyramid.

A length of the second image and a length of the third image may be formed to be equal to each other.

The second image and the third image may be orthogonal to each other.

The first reflection surface and the second reflection surface may be repeatedly formed along the light emitting surface.

Another exemplary embodiment of the present invention provides a vehicle lamp, including: a reflector reflecting light of light guides, in which a pair of the light guides are formed to face each other at a predetermined distance, and the reflector includes a first reflection surface and a second reflection surface alternately forming an inner circumferential surface, together with at least a part of different light emitting surfaces of the light guides and the inner circumferential surface is converged in a direction opposite to an irradiation direction to form a convergent point.

At least a part of the light emitting surface may form a first image that is a real image, the first reflection surface may reflect the first image to form a second image that is a virtual image, and the second reflection surface may reflect the first image to form a third image that is a virtual image.

The first image, the second image, and the third image may be connected with one another.

When the first image, the second image, and the third image are formed of a line, the first image, the second image, and the third image may form a triangle. When the first image, the second image, and the third image are formed of a surface, the first image, the second image, and the third image may form an apex-truncated trigonal pyramid.

A length of the second image and a length of the third image may be formed to be equal to each other.

The second image and the third image may be orthogonal to each other.

The first reflection surface and the second reflection surface may be repeatedly formed along the light emitting surface.

Yet another exemplary embodiment of the present invention provides a vehicle lamp, including: a reflector reflecting light of a light guide, in which the reflector includes a first reflection surface and a second reflection surface each forming obtuse angles with respect to a light emitting surface of the light guide, the first reflection surface and the second reflection surface or an extended surface of the first reflection surface and an extended surface of the second reflection surface contact each other.

The light emitting surface may form a first image that is a real image, the first reflection surface may reflect the first image to form a second image that is a virtual image, and the second reflection surface may reflect the first image to form a third image that is a virtual image.

The first image, the second image, and the third image may be connected with one another to form a single lighting image.

The lighting image may have a polygonal shape.

In the reflector, the first reflection surface and the second reflection surface may be repeatedly formed along the light emitting surface.

Some region of the reflector may form at least two unit light emitting surfaces by covering a part of the light emitting surface and the first reflection surface and the second reflection surface may each contact both ends of the unit light emitting surface.

The unit light emitting surface may form a first image that is a real image, the first reflection surface may reflect the first image to form a second image that is a virtual image, and the second reflection surface may reflect the first image to form a third image that is a virtual image.

The first image, the second image, and the third image may be connected with one another to form a single lighting image.

The lighting image may have a polygonal shape.

The light guide may be formed to have an annular shape.

A tangent line between the first reflection surface and the second reflection surface may be located inside the annular light guide when being seen based on an irradiation direction.

The tangent line between the first reflection surface and the second reflection surface may be located outside the annular second light guide when being seen based on an irradiation direction.

According to the vehicle lamp of the exemplary embodiments of the present invention, it is possible to generate the differentiated lighting image patterns using a small number of light sources, thereby reducing the manufacturing costs and the manufacturing man hour of the vehicle lamp while increasing the aesthetic appearance of the vehicle.

According to the vehicle lamp of the exemplary embodiments of the present invention, it is possible to implement the lighting images having an isosceles triangle or a regular triangle or the patterned lighting image in which the lighting images are repeatedly formed, thereby constantly showing the shape of the lighting images in a triangular shape even though being seen at any angle.

According to the vehicle lamp of the exemplary embodiments of the present invention, it is possible to generate the plurality of patterned lighting images using a small number of light sources, thereby reducing the manufacturing costs and the manufacturing man hour of the vehicle lamp while increasing the aesthetic appearance of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
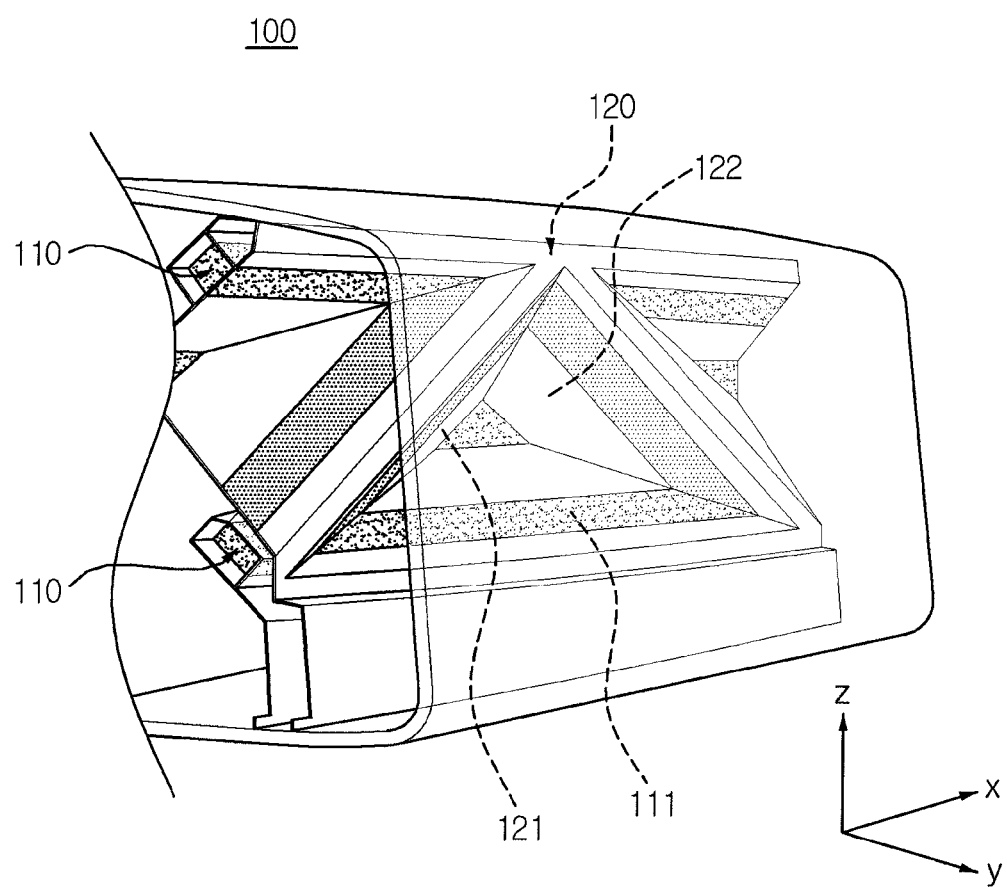
FIG. 1 is a perspective view illustrating a vehicle lamp according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION

Hereinafter, exemplary embodiments of the present invention will be described in detail with reference to the accompanying drawings. It should be noted that in adding reference numerals to elements of each drawing, like reference numerals refer to like elements even though like elements are shown in different drawings. The exemplary embodiment of the present invention is described below, but the technical idea of the present invention is not limited thereto and is modified and can be variously practiced by those skilled in the art.

Figure 2:
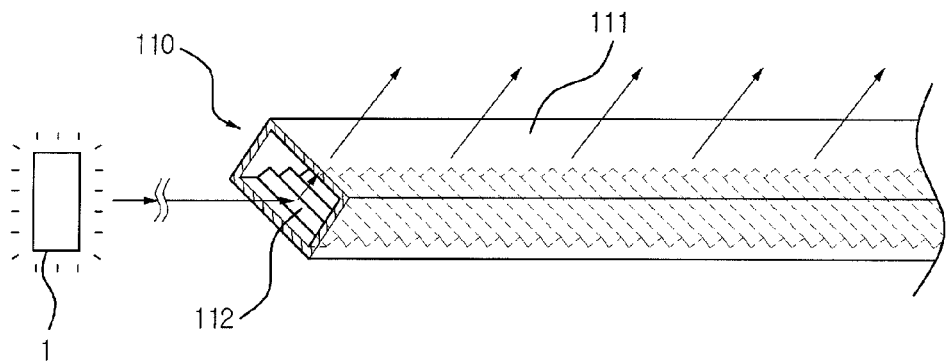
FIG. 2 is a diagram illustrating a first light guide according to the exemplary embodiment illustrated in FIG. 1.
Figure 3:
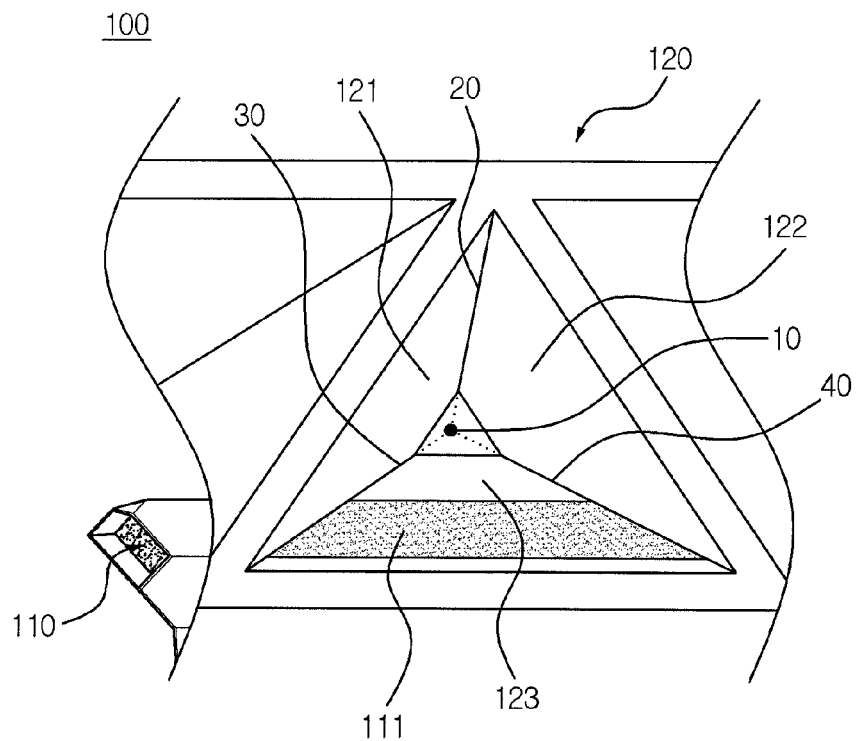
FIG. 3 is a diagram illustrating the first light guide illustrated in FIG. 1 and a first reflector including a first reflection surface and a second reflection surface.

FIG. 1 is a perspective view illustrating a vehicle lamp according to an exemplary embodiment of a invention, FIG. 2 is a diagram illustrating a first light guide according to the exemplary embodiment illustrated in FIG. 1, and FIG. 3 is a diagram illustrating the first light guide illustrated in FIG. 1 and a first reflector including a first reflection surface and a second reflection surface.

FIGS. 1 to 3 clearly illustrate only main feature portions in order to conceptually understand the invention. As a result, it is expected to implement various modifications of an explanatory diagram and the scope of the present invention is not necessarily limited to specific shapes illustrated in the drawings.

Referring to FIG. 1, a vehicle lamp 100 according to an exemplary embodiment of the invention includes a first light guide 110 that is extendedly disposed in a width direction of a vehicle at a rear portion of a vehicle and a first reflector 120 including a first reflection surface 121 and a second reflection surface 122. Here, the first reflection surface 121 and the second reflection surface may be configured to have a flat shape.

The vehicle lamp 100 according to an exemplary embodiment has a technical feature of implementing lighting images having a triangular shape by continuously forming a real image of the first light guide 110 and a reflected image of the first reflector 120. In particular, the vehicle lamp 100 according to the exemplary embodiment has a technical feature of implementing the lighting image having an isosceles triangle or a regular triangle to keep the lighting image having a triangular shape even though being seen at any angle.

First, the first light guide 110 will be described with reference to FIG. 2. The first light guide 110 is a member that converts a point emitting image into a surface emitting image using a light source such as a light emitting diode (LED). Referring to FIG. 2, the first light guide 110 is extendedly formed in a longitudinal direction to have a bar shape. Both ends or any one end of the first light guide 110 is provided with a light source 1. Light emitted from the light source 1 is transferred into the first light guide 110. The light transferred into the first light guide 110 is refracted toward a light emitting surface 111 of the first light guide 110 due to an unevenness part 112 formed on a bottom surface inside the first light guide 110. The light refracted toward the light emitting surface 111 is irradiated through the light emitting surface 111 to generate a surface emitting image.

When using the first light guide 110, it is possible to implement linear lighting images using a small number of light sources.

Referring to FIG. 3, at least a part of the light emitting surface 111 of the first light guide 110 and the first reflection surface 121 and the second reflection surface 112 forms an inner circumferential surface. Here, the inner circumferential surface means a circumferential surface formed by connecting the first reflection surface 121 with the second reflection surface 122 so that the first reflection surface 121 and the second reflection surface 122 face inwardly, by using the entire or a part of the light emitting surface 111 as one surface.

The inner circumferential surface is converged in a direction opposite to an irradiation direction of the vehicle lamp 100 to form a convergent point 10. That is, the extended surface of the light emitting surface 110 and the first reflection surface 121 and the second reflection surface 122 are converged in a direction opposite to the irradiation direction.

As illustrated in FIG. 3, the first reflection surface 121 and the second reflection surface 122 form a first crossing line 20 and the first reflection surface 121 and the light emitting surface 111 form a second crossing line 30. The second reflection surface 122 and the light emitting surface 111 form a third crossing line 40. Here, the first crossing line 20, the second crossing line 30, and the third crossing line 40 are met at the convergent point 10.

In the exemplary embodiment, the light emitting surface 111, the first reflection surface 121, and the second reflection surface 122 may form an apex-truncated trigonal pyramid.

Figure 4:
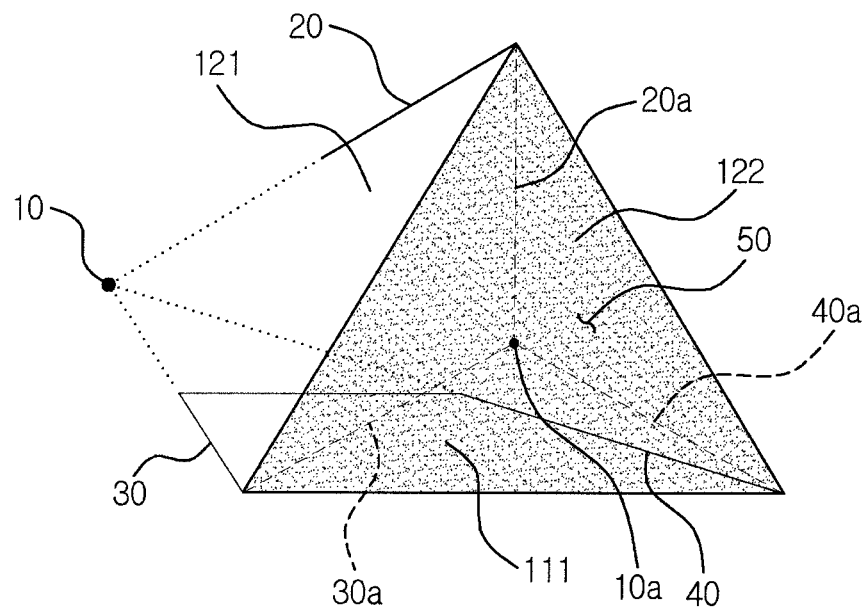
FIG. 4 is a diagram illustrating a projection surface of an extended surface of a light emitting surface of the first light guide, the first reflection surface, and the second reflection surface that are illustrated in FIG. 3, when being seen from the front.
Figure 5:
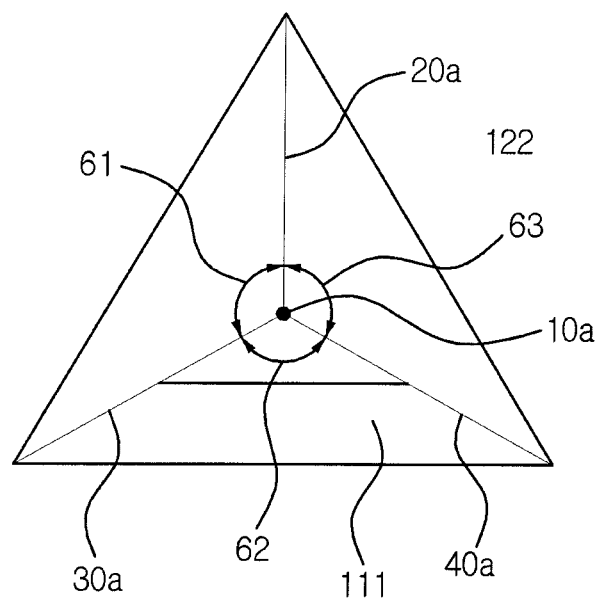
FIG. 5 is a diagram illustrating a projection surface having a regular triangular shape, as the projection surface of the extended surface of the light emitting surface, the first reflection surface, and the second reflection surface that are illustrated in FIG. 3.

Meanwhile, FIG. 4 is a diagram illustrating a projection surface of an extended surface of a light emitting surface, the first reflection surface, and the second reflection surface that are illustrated in FIG. 3, when being seen from the front and FIG. 5 is a diagram illustrating a projection surface having a regular triangular shape, as the projection surface of the extended surface of the light emitting surface, the first reflection surface, and the second reflection surface that are illustrated in FIG. 3.

Referring to FIG. 4, in terms of viewing the vehicle lamp 100 according to the exemplary embodiment from the front, when a virtual projection surface 50 of the extended surface of the light emitting surface 111, the first reflection surface 121, and the second reflection surface 122 is set, the first crossing line 20, the second crossing line 30, and the third crossing line 40 are projected to the projection surface 50 to form a first projection line 20a, a second projection line 30a, and a third projection line 40a. The convergent point 10 is projected to the projection surface 50 to form a projected point 10a.

Referring to FIG. 5, the vehicle lamp 100 according to the exemplary embodiment may be configured such that the first projection line 20a, the second projection line 30a, and the third projection line 40a based on the projected point 10a may form the same angles 61, 62, and 63.

When the light emitting surface 111, the first reflection surface 121, and the second reflection surface 122 are disposed so that the first projection line 20a, the second projection line 30a, and the third projection line 40a form the same angles, the lighting images having an isosceles triangle or a regular triangle may be implemented.

Meanwhile, the light emitting surface 111 may be formed on a surface of a base surface 123 that configures an inner circumferential surface, together with the first reflection surface 121 and the second reflection surface 122. In this case, the first light guide 110 may be disposed so that the light emitting surface ill is inclined in the irradiation direction. This is to increase visibility for a real image of the first light guide 110. Hereinafter, the lighting images implemented by the vehicle lamp 100 according to the exemplary embodiment will be described with reference to FIGS. 6 to 8.

As described above, the light emitting surface 111 provides the real image. On the other hand, the first reflection surface 121 and the second reflection surface 122 each provide a virtual image. The vehicle lamp 100 according to the exemplary embodiment may implement a single lighting image by mutually connecting the single real image with two virtual images.

Figure 6:
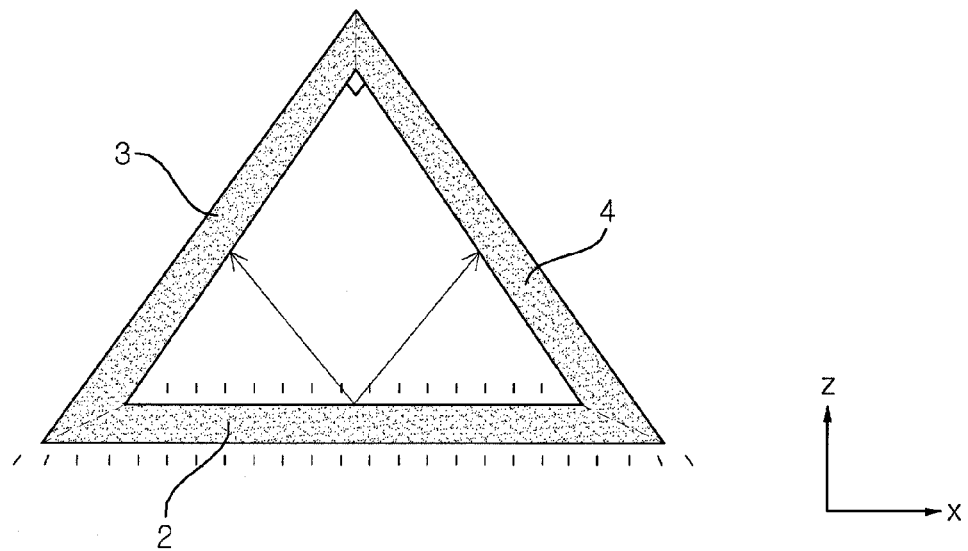
FIG. 6 is a diagram illustrating lighting images having a triangular shape implemented by the exemplary embodiment illustrated in FIG. 1.

FIG. 6 is a diagram illustrating lighting images having a triangular shape implemented by the exemplary embodiment illustrated in FIG. 1.

According to the vehicle lamp 100 of the exemplary embodiment, as illustrated in FIG. 6, a first image 2 formed as a real image and a second image 3 and a third image 4 formed as a virtual image due to the reflection of the first image 2 are connected with each other to form the single lighting image forming a triangle when viewing the vehicle lamp 100 from the front.

Describing in detail, when the first image 2, the second image 3, and the third image 4 are implemented by lines, the first image 2, the second image 3, and the third image 4 are connected with one another to form a triangle. Meanwhile, when the first image 2, the second image 3, and the third image 4 are implemented by surfaces, the first image 2, the second image 3, and the third image 4 are connected with one another to form an apex-truncated trigonal pyramid.

In this case, a length of the second image 3 and a length of the third image 4 may be formed so as to be equal to each other to implement the lighting image having an isosceles triangle or a regular triangle. The lighting image may be kept to have a triangular shape even though being seen at any angle from the outside of a vehicle. The second image 3 and the third image 4 may be implemented so as to be orthogonal to each other.

Figure 7:
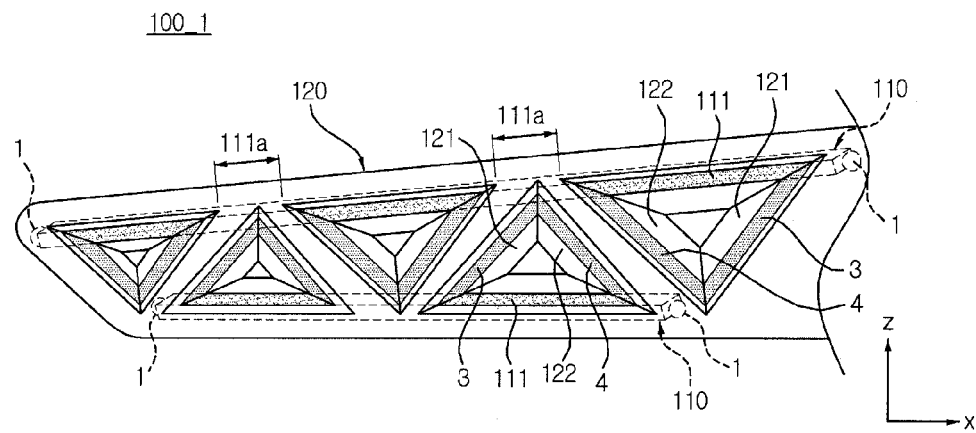
FIG. 7 is a diagram illustrating a first modification example of a vehicle lamp in which the lighting images illustrated in FIG. 6 are repeatedly implemented alternately in a non-inverted shape and an inverted shape.
Figure 8:
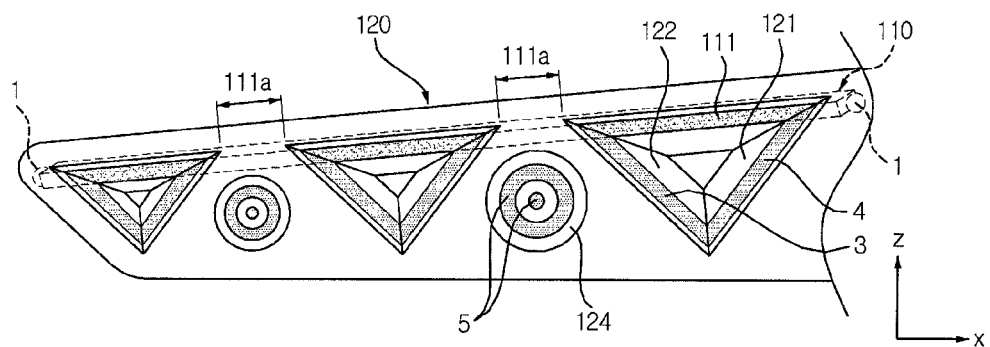
FIG. 8 is a diagram illustrating a second modification example in which the lighting images illustrated in FIG. 6 and sub-lighting images are repeatedly implemented.

FIG. 7 is a diagram illustrating a first modification example of a vehicle lamp in which the lighting images illustrated in FIG. 6 are repeatedly implemented alternately in a non-inverted shape and an inverted shape and FIG. 8 is a diagram illustrating a second modification example in which the lighting images illustrated in FIG. 6 and sub-lighting images are repeatedly implemented.

Referring to FIG. 7, in a first modification example 100_1 of the vehicle lamp, the lighting images having the foregoing triangular shape are repeatedly implemented by changing a direction. In the first modification example 100_1 of the vehicle lamp, a pair of the first light guides 110 is each disposed above and below the first reflector 120. In this case, different light emitting surfaces 111 of the first light guides 110 are disposed to face each other.

The first reflection surface 121 and the second reflection surface 122 alternately form the inner circumferential surface with the different light emitting surfaces 111 of the first light guides 110. In other words, in the first light guides 110 disposed to face each other, when a part of the light emitting surface 111 of the first light guide 110 on one side and the first reflection surface 121 and the second reflection surface 122 form the inner circumferential surface, the subsequently formed first reflection surface 121 and second reflection surface 122 form another inner circumferential surface, together with a part of the light emitting surface 111 of the first light guide 110 on the other side.

In this case, in order to pattern and divide the linear images continued by all the light emitting surfaces 111 in plural, some region 111a of the first reflector 120 is formed to cover a part of the light emitting surface 111.

As illustrated in FIG. 7, the first modification example 100_1 of the vehicle lamp has an advantage of implementing the plurality of differentiated lighting images using only four light sources by alternately forming the lighting images having a non-inverted triangular shape and the lighting images having an inverted triangular shape in a longitudinal direction of the first light guide 110.

Meanwhile, referring to FIG. 8, in a second modification example 100_2 of the vehicle lamp, the lighting images having the inverted triangular shape are repeatedly implemented at a predetermined interval. The sub-lighting images 5 may be repeatedly implemented between the lighting images having a triangular shape. Although not illustrated, in the second modification example 100_2, the lighting images having a non-inverted triangular shape can be repeatedly implemented at a predetermined interval.

In the exemplary embodiment, in the second modification example 100_2 of the vehicle lamp, the single first light guide 110 may be disposed above the first reflector 120. A separate light source for the sub-lighting images 5 and a third reflection surface 124 may be disposed between the first reflection surface 121 and the second reflection surface 122. FIG. 6 illustrates the annular sub-lighting images 5, but the present invention is not limited thereto and may be changed in various forms.

Figure 9:
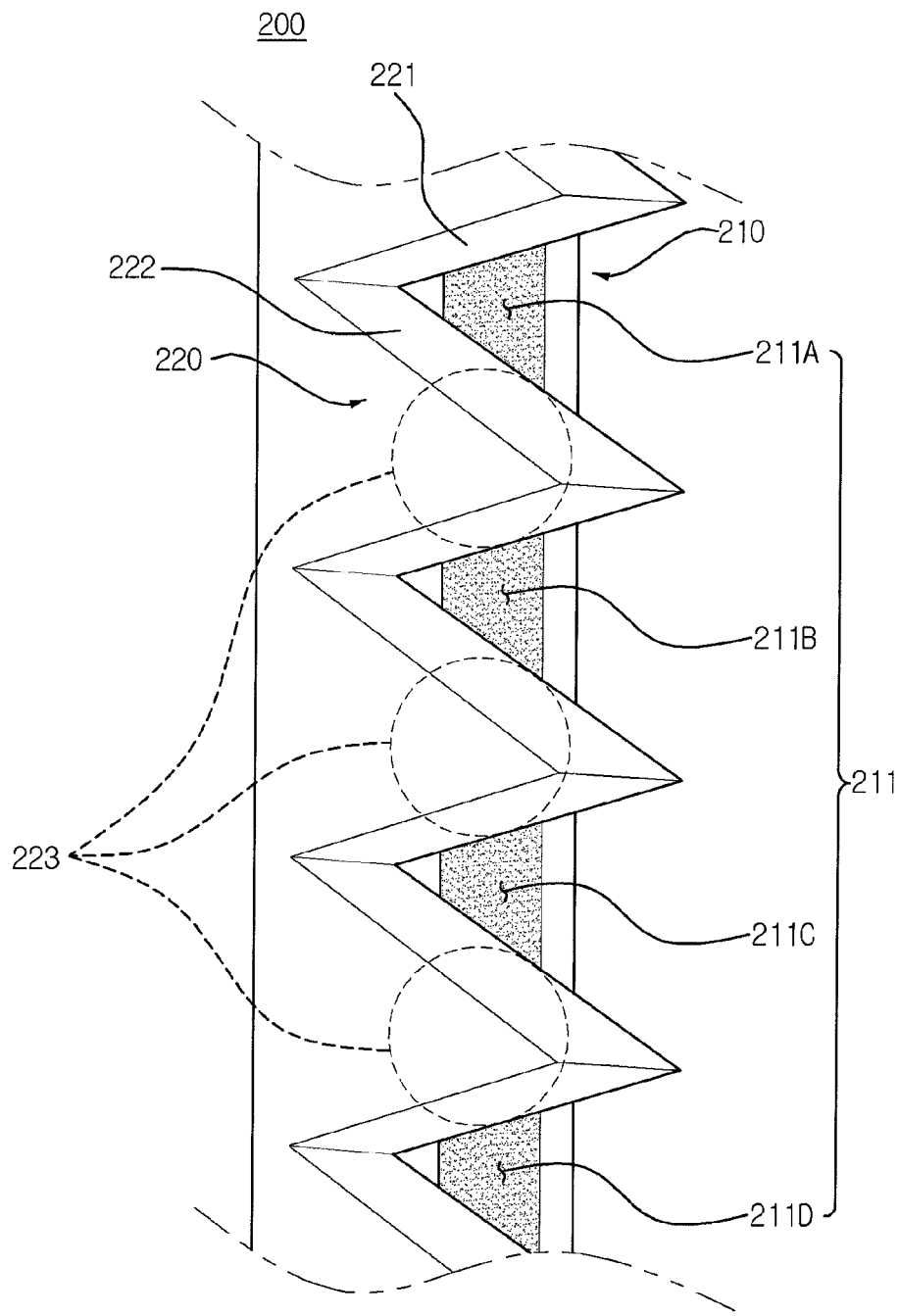
FIG. 9 is a perspective view illustrating a vehicle lamp according to a second exemplary embodiment of the present invention.

FIG. 9 is a perspective view illustrating a vehicle lamp according to an exemplary embodiment of the present invention.

FIG. 9 clearly illustrates only main feature portions in order to conceptually understand an embodiment of the present invention. As a result, it is expected to implement various modifications of an explanatory diagram and the scope of the present invention is not necessarily limited to specific shapes illustrated in the drawings.

Referring to FIG. 9, a vehicle lamp 200 according to an exemplary embodiment of the present invention includes a second light guide 210 and a second reflector 220 including a third reflection surface 221 and a fourth reflection surface 222.

The vehicle lamp 220 according to the exemplary embodiment of the present invention has a technical feature of implementing lighting images continued in plural and having a polygonal shape by disposing the second reflector 220 having a sawtooth shape in front of a light emitting surface 210 of the second light guide 210.

First, the second light guide 210 will be described.

Figure 10:
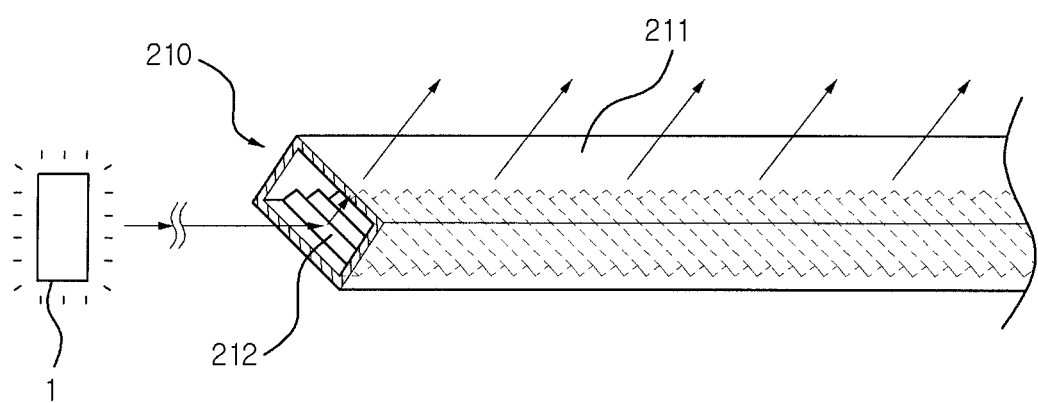
FIG. 10 is a top view illustrating a second light guide illustrated in FIG. 1.

FIG. 10 is a top view illustrating the second light guide illustrated in FIG. 1.

The second light guide 210 is a member that converts a point emitting image into a surface emitting image using a light source such as a light emitting diode (LED). Referring to FIG. 10, both ends or any one end of the second light guide 210 is provided with a light source 1. Light emitted from the light source 1 is transferred into the second light guide 210. The light transferred into the second light guide 210 is refracted toward a light emitting surface 210 of the second light guide 210 due to an unevenness part 212 formed on a bottom surface inside the second light guide 210. The light refracted toward the light emitting surface 211 is irradiated through the light emitting surface 211 to generate a surface emitting image.

Figure 13:
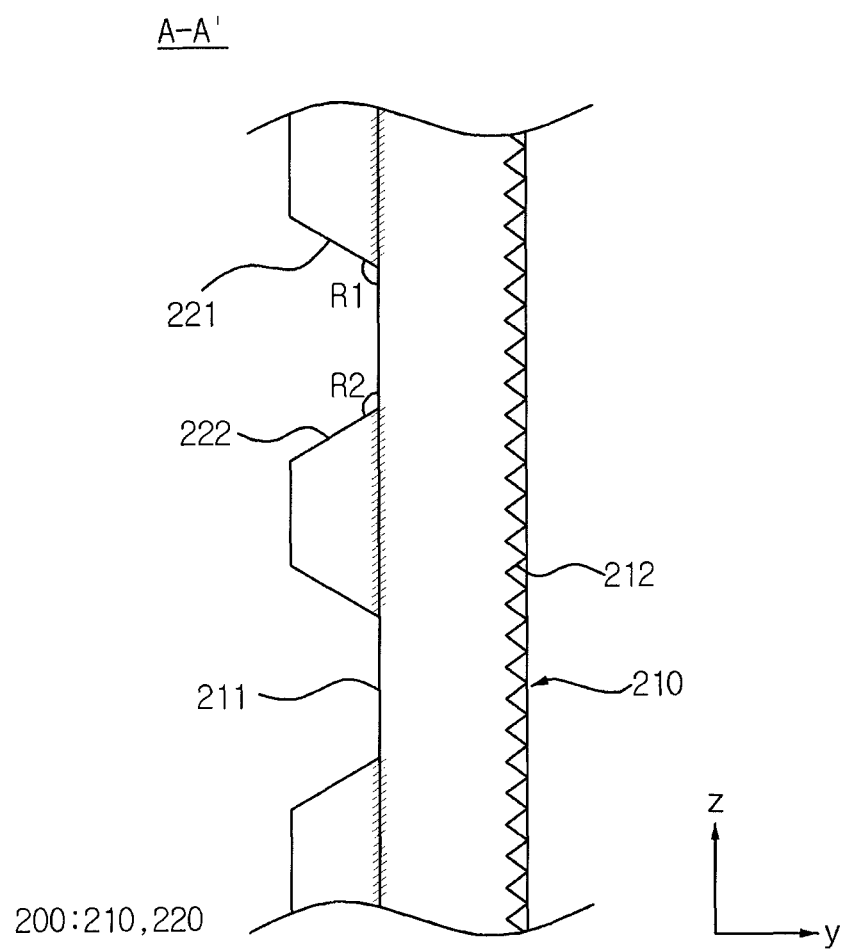
FIG. 13 is a cross-sectional view of the exemplary embodiment based on line A-A' of FIG. 3.

The second light guide 210 may be practiced in a straight shape or a bent shape and as illustrated in FIG. 13, may be practiced in an annular shape. When using the second light guide 210, it is possible to implement linear lighting images using a small number of light sources.

Next, the second reflector 220 will be described with reference to FIGS. 9, 11, 12 and 13

Figure 11:
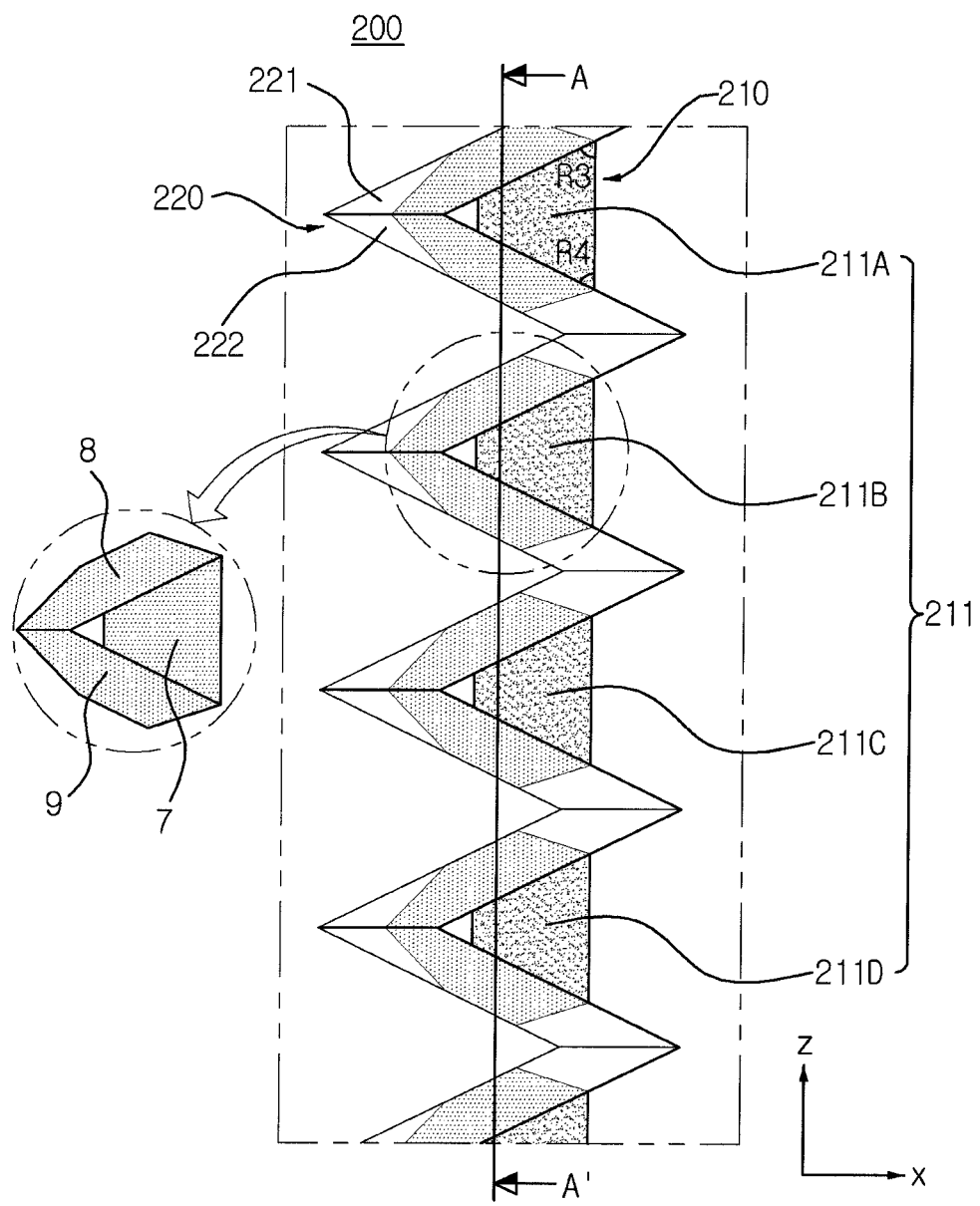
FIG. 11 is a front view illustrating the lighting image according to the exemplary embodiment illustrated in FIG. 1.
Figure 12:
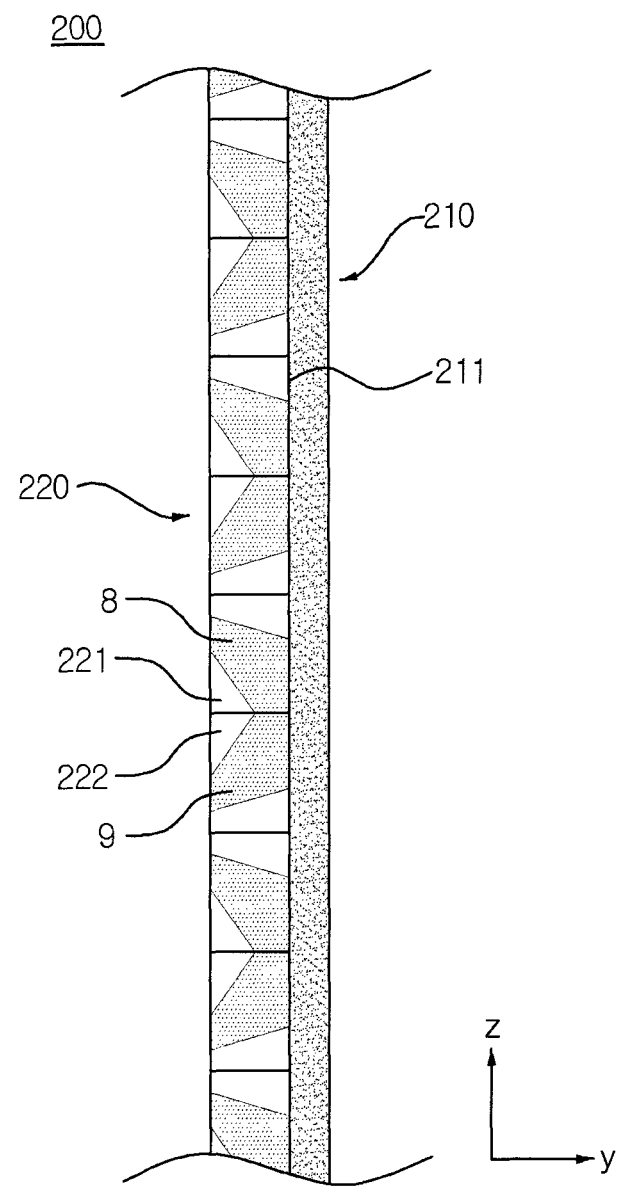
FIG. 12 is a side view illustrating the lighting image according to the exemplary embodiment illustrated in FIG. 1.

FIG. 11 is a front view illustrating the lighting image according to the embodiment illustrated in FIG. 1 and FIG. 12 is a side view illustrating the lighting image according to the embodiment illustrated in FIG. 1 and FIG. 13 is a cross-sectional view of the exemplary embodiment based on line A-A' of FIG. 11.

The second reflector 220 reflects light of the foregoing second light guide 210 to form some region of the lighting image. The second reflector 220 is disposed in front of the light emitting surface 211 of the second light guide 210. The second reflector 220 includes a third reflection surface 221 and a fourth reflection surface 222. In this case, the third reflection surface 221 and the fourth reflection surface 222 form obtuse angles (R1 and R2 of FIG. 12) with respect to the light emitting surface 211. Simultaneously, the third reflection surface 221 and the fourth reflection surface 222 are disposed to be inclined with respect to a longitudinal direction of the second light guide 210 at predetermined angles (R3 and R4 of FIG. 11) and are thus formed so that the third reflection surface 221 and the fourth reflection surface 222 contact each other or extended surfaces thereof contact each other.

Therefore, the third reflection surface 221 and the fourth reflection surface 222 that are continuously formed have a sawtooth shape.

Meanwhile, as described above, the second reflector 220 is disposed in front of the light emitting 211 of the second light guide 210, such that light of the light emitting surface 211 is directly shielded in some region (223 of FIG. 9) of the second reflector 220. Some region (223 of FIG. 9) of the second reflector 220 corresponds to the region of the second reflector 220 that is approximately located between the corresponding third reflection surface 221 and fourth reflection surface 222 and adjacent third reflection surface and fourth reflection surface and is repeated along the light emitting surface 211.

Therefore, some region (223 of FIG. 9) of the second reflector 220 is patterned in a cell form in which the images directly implemented by the light emitting surface 211 are formed at a predetermined interval, when being seen based on the irradiation direction.

In this case, a part of the light emitting surface 211 implementing the images patterned in the cell form is referred to as unit light emitting surfaces 211A, 2113, 211C, 211D, . . . , . The foregoing third reflection surface 221 and fourth reflection surface 222 are formed to contact both ends of the unit light emitting surfaces 211A, 2113, 211C, 211D, . . . , respectively.

Referring to FIGS. 11, 12 and 13, the unit light emitting surfaces 211A, 211B, 211C, 211D . . . may provide as a real image a fourth image 7 forming some region among the lighting images having a polygonal shape. The third reflection surface 221 and the fourth reflection surface 222 may provide as a virtual image a fifth image 8 and a sixth image 9 forming the remaining region among the lighting image having a polygonal shape. In this case, the fourth image 7, the fifth image 8, and the sixth image 9 may be adjacent to one another to form a single lighting image.

The lighting image may be repeatedly formed along the second light guide 210 at a predetermined interval to form the plurality of patterned lighting images. Meanwhile, the lighting images of the vehicle lamp 200 according to the exemplary embodiment of the present invention may be generated to have various shapes such as a pentagon, an octagon, and the like by changing heights of the third reflection surface 221 and the fourth reflection surface 222, based on the inclined angle of the third reflection surface 221 and the fourth reflection surface 222 with respect to the light emitting surface 211 and the irradiation direction.

Hereinafter, the annular light guide and the reflector and the lighting images implemented thereby will be described with reference to FIGS. 14 to 17.

Figure 14:
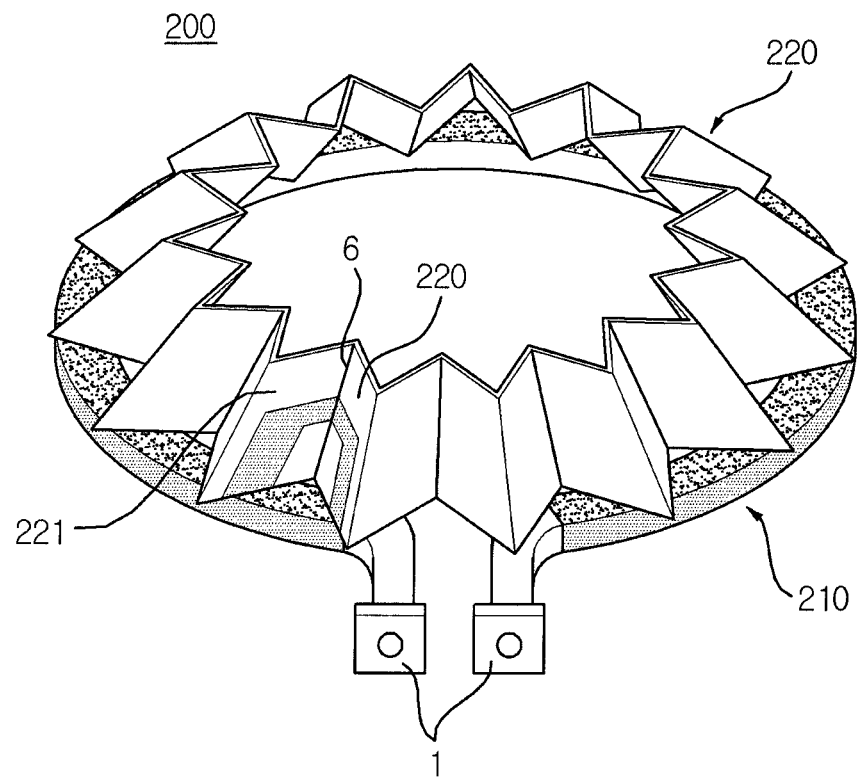
FIG. 14 is a diagram illustrating a vehicle lamp including an annular second light guide and a second reflector corresponding thereto.

FIG. 14 is a diagram illustrating a vehicle lamp including an annular second light guide and a second reflector corresponding thereto. Referring to FIG. 14, in the vehicle lamp 200 according to the exemplary embodiment of the present invention, the second light guide 210 is formed to have an annular shape and the second reflector 220 is also formed to have an annular shape to correspond thereto.

Figure 15:
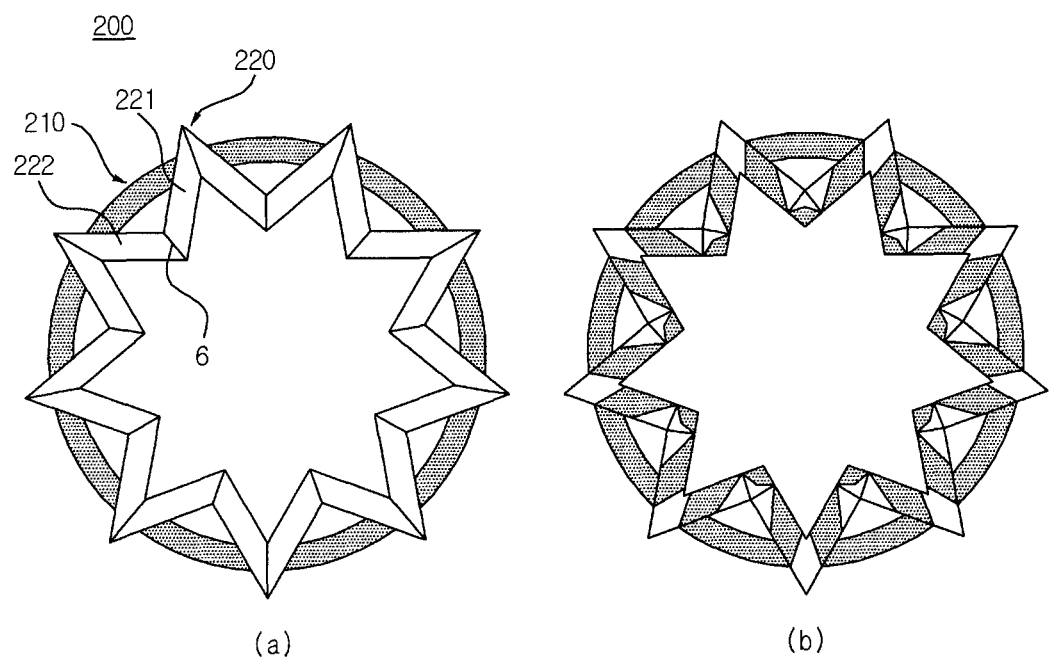
FIGS. 15 and 16A and 16B are diagrams illustrating a vehicle lamp in which a tangent line between a third reflection surface and a fourth reflection surface is located inside the annular second right guide and lighting images implemented thereby.
Figure 16:
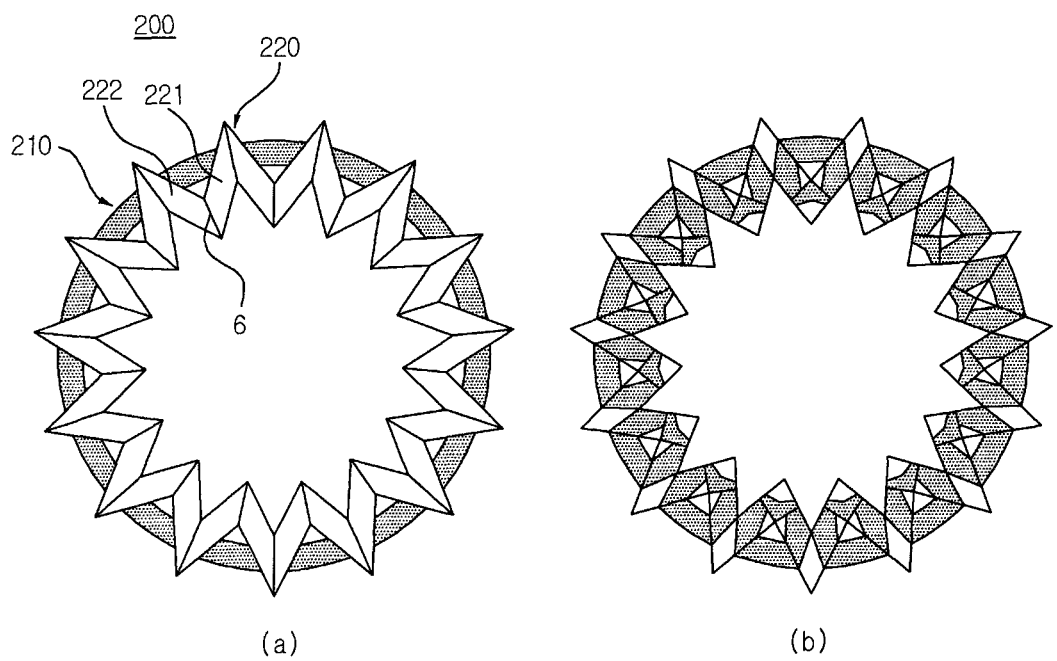
Figure 17:
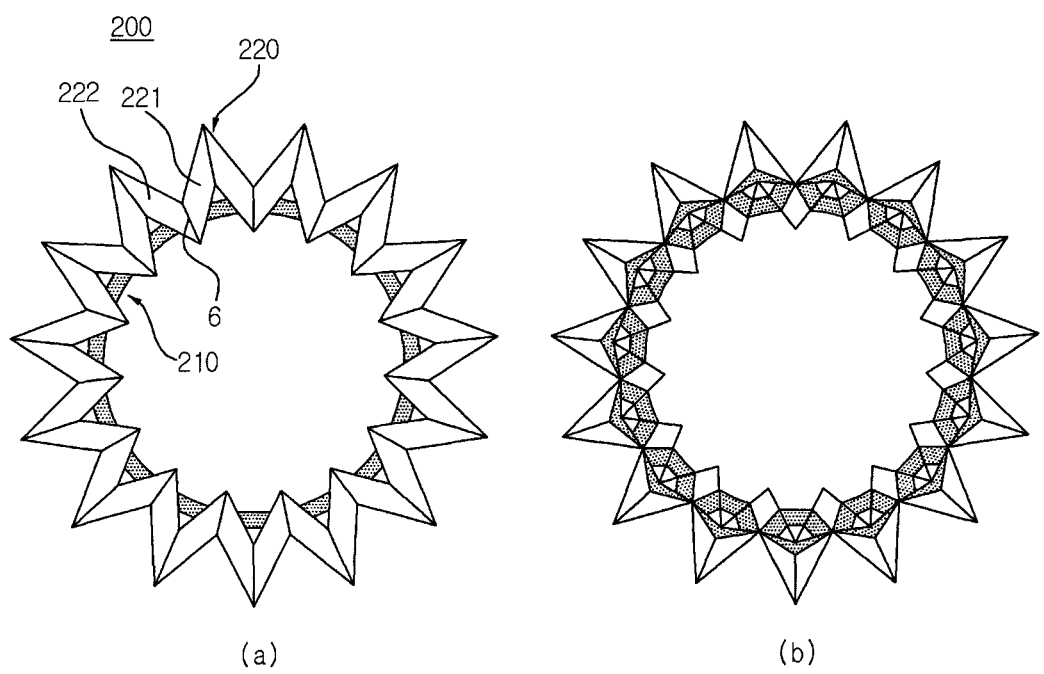
FIGS. 17A and 17B are diagrams illustrating a vehicle lamp in which the tangent line between the third reflection surface and the fourth reflection surface is located outside the annular second light guide.

FIGS. 15 and 16 are diagrams illustrating a vehicle lamp in which a tangent line between a third reflection surface and a fourth reflection surface is located inside the annular light guide and a lighting image implemented thereby.

Referring to FIG. 15A, the second reflector 220 includes nine pairs of third reflection surfaces 221 and fourth reflection surfaces 222 along the annular second light guide 210. In this case, a tangent line 6 between the third reflection surface 221 and the fourth reflection surface 222 is located inside the annular second light guide 210. The lighting images of the vehicle lamp 200 are illustrated in FIG. 16B.

Referring to FIG. 16A, the second reflector 220 includes fifteen pairs of third reflection surfaces 221 and fourth reflection surfaces 222 along the annular second light guide 210. In this case, the tangent line 6 between the third reflection surface 221 and the fourth reflection surface 222 is located inside the annular second light guide 210. The lighting images of the vehicle lamp 200 are illustrated in FIG. 16B.

FIGS. 17A and 17B are diagrams illustrating a vehicle lamp in which the tangent line between the third reflection surface and the fourth reflection surface is located outside the annular second light guide.

Meanwhile, referring to FIG. 17A, the second reflector 220 includes fifteen pairs of third reflection surfaces 221 and fourth reflection surfaces 222 along the annular second light guide 210 and the tangent line 6 between the third reflection surface 221 and the fourth reflection surface 222 is located outside the annular second light guide 210. The lighting images of the vehicle lamp 200 are illustrated in FIG. 17B.

Unless indicated otherwise in the detailed description, all the terms including technical and scientific terms and used in the specification have the same meaning as those that are generally understood by those who skilled in the art. It must be understood that generally used terms like the terms defined by the dictionary are identical with the meanings within the context of the related art, and they should not be ideally or excessively formally construed unless the context clearly dictates otherwise in the present disclosure.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vehicle lamp, comprising:
a light source configured to irradiate visible light beams;
a first light guide comprising a light emitting surface configured to guide light beams irradiated from the light source and further configured to emit light beams therefrom to provide a first image; and
a first reflector comprising a first reflection surface and a second reflection surface, each of the first and second reflection surfaces configured to reflect light beams incident thereto,
wherein the first light guide and the first reflector are arranged relative to each other such that:
part of light beams emitted from the light emitting surface are reflected on the first reflection surface to provide a second image on a first portion of the first reflection surface,
part of light beams emitted from the light emitting surface are reflected on the second reflection surface to provide a third image on a second portion of the second reflection surface,
the light emitting surface is connected to the first portion of the first reflection surface and also connected to the second portion of the second reflection surface such that the first image is connected to the second and third images to form a first single integrated shape when viewed from a point outside a vehicle comprising the vehicle lamp.

2. The vehicle lamp of claim 1, wherein the first single integrated shape comprises a triangle.

3. The vehicle lamp of claim 1, wherein each of the first image, the second image, and the third image forms generally a trapezoidal shape.

4. The vehicle lamp of claim 1, wherein the second image and the third image are substantially plane-symmetrical to each other.

5. The vehicle lamp of claim 4, wherein the second image and the third image are substantially orthogonal to each other.

6. The vehicle lamp of claim 1, wherein the first light guide further comprises one or more additional emitting surfaces, wherein the first reflector further comprises one or more additional light reflection surfaces, wherein the one or more additional light emitting surfaces and the one or more additional light reflection surfaces are arranged relative to each other to provide one or more additional integrated shapes formed by light beams emitted from the one or more additional light emitting surfaces and light beams reflected on the one or more additional light reflection surfaces, wherein the first single integrated shape and the one or more additional integrated shapes are arranged to provide a pattern.

7. A vehicle lamp, comprising:
at least a pair of first light guides comprising light emitting surfaces; and
a first reflector configured to reflect light from the first light guides,
wherein a pair of the first light guides are formed to face each other at a predetermined distance, and
wherein the first reflector includes a first reflection surface and a second reflection surface alternately forming an inner circumferential surface, together with at least a part of different light emitting surfaces of the first light guides, and wherein the inner circumferential surface is converged in a direction opposite to an irradiation direction to form a convergent point.

8. The vehicle lamp of claim 7, wherein at least a part of the light emitting surface is configured to form a first image that is a real image, wherein the first reflection surface is configured to reflect the first image to form a second image that is a virtual image, and wherein the second reflection surface is configured to reflect the first image to form a third image that is a virtual image.

9. The vehicle lamp of claim 8, wherein the first image, the second image, and the third image are connected with one another.

10. The vehicle lamp of claim 8, wherein when each of the first image, the second image, and the third image are formed of a line, the first image, the second image, and the third image collectively form a triangle.

11. The vehicle lamp of claim 8, wherein when each of the first image, the second image, and the third image are formed of a surface, the first image, the second image, and the third image collectively form an apex-truncated trigonal pyramid.

12. The vehicle lamp of claim 8, wherein a length of the second image and a length of the third image are formed to be substantially the same with each other.

13. The vehicle lamp of claim 12, wherein the second image and the third image are substantially orthogonal to each other.

14. The vehicle lamp of claim 7, wherein the first reflection surface and the second reflection surface are repeatedly formed along the light emitting surface.

15. A vehicle lamp, comprising:
a second light guide comprising at least a light emitting surface; and
a second reflector configured to reflect light from the second light guide,
wherein the second reflector includes a third reflection surface and a fourth reflection surface each forming obtuse angles with respect to a light emitting surface of the second light guide, wherein the third reflection surface and the fourth reflection surface or an extended surface of the third reflection surface and an extended surface of the fourth reflection surface contact each other.

16. The vehicle lamp of claim 15, wherein the light emitting surface is configured to form a fourth image that is a real image, wherein the third reflection surface is configured to reflect the fourth image to form a fifth image that is a virtual image, and wherein the fourth reflection surface is configured to reflect the fourth image to form a sixth image that is a virtual image.

17. The vehicle lamp of claim 16, wherein the fourth image, the fifth image, and the sixth image are connected with one another to form a single lighting image.

18. The vehicle lamp of claim 17, wherein the lighting image has a polygonal shape.

19. The vehicle lamp of claims 15, further comprising one or more additional third reflection surfaces and one or more additional fourth reflection surfaces, wherein in the second reflector, the third reflections surface, and the fourth reflection surfaces are repeatedly formed along the light emitting surface.

20. The vehicle lamp of claim 19, wherein some regions of the second reflector form at least two unit light emitting surfaces by partly covering the light emitting surface and the third reflection surface and the fourth reflection surface each contact both ends of the unit light emitting surface.

21. The vehicle lamp of claim 20, wherein the unit light emitting surface is configured to form a fourth image that is a real image, wherein the third reflection surface is configured to reflect the fourth image to form a fifth image that is a virtual image, and wherein the fourth reflection surface is configured to reflect the fourth image to form a sixth image that is a virtual image.

22. The vehicle lamp of claim 21, wherein the fourth image, the fifth image, and the sixth image are connected with one another to collectively form a single lighting image.

23. The vehicle lamp of claim 22, wherein the lighting image has a polygonal shape.

24. The vehicle lamp of claim 19, wherein the second light guide is formed to have an annular shape.

25. The vehicle lamp of claim 24, wherein a tangent line between the third reflection surface and the fourth reflection surface is located inside the annular second light guide when viewing in an irradiation direction.

26. The vehicle lamp of claim 24, wherein the tangent line between the third reflection surface and the fourth reflection surface is located outside the annular second light guide when viewing in an irradiation direction.

* * * * *